(12) United States Patent
Nishikawa et al.

(10) Patent No.: US 6,583,940 B2
(45) Date of Patent: Jun. 24, 2003

(54) PROJECTION SYSTEM

(75) Inventors: Jun Nishikawa, Kawanishi (JP);
Shigeru Sawamura, Sakai (JP);
Katsuhiro Takamoto, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/885,586

(22) Filed: Jun. 20, 2001

(65) Prior Publication Data

US 2002/0027720 A1 Mar. 7, 2002

(30) Foreign Application Priority Data

Jun. 20, 2000 (JP) .................................. 2000-184360

(51) Int. Cl.⁷ .................. G02B 9/00; G02B 27/14; G03B 21/28; G03B 21/14
(52) U.S. Cl. .................. 359/738; 359/636; 359/649; 353/81; 353/89
(58) Field of Search .................. 353/81, 82, 89; 359/263, 636, 649, 738

(56) References Cited

U.S. PATENT DOCUMENTS 6,382,799 B1 * 5/2002 Nishikawa et al. ......... 353/122
6,454,417 B1 * 9/2002 Takamoto et al. ............ 353/33
2002/0027720 A1 * 3/2002 Nishikawa et al. ......... 359/678

FOREIGN PATENT DOCUMENTS

JP 08-251520 9/1996

* cited by examiner

Primary Examiner—Georgia Epps
Assistant Examiner—David N. Spector
(74) Attorney, Agent, or Firm—Sidley Austin Brown & Wood LLP (57) ABSTRACT

A projection system that is capable of providing a high-performance projection system and producing a high contrast projection image by using an optical modulation element, which can be positioned a predetermined distance away from an illumination optical system and a projection optical system. The optical modulation element is capable of modulating light received from the illumination optical system and projecting the modulated light to a projection optical system in the direction of a projection surface.

27 Claims, 7 Drawing Sheets

PROJECTION SYSTEM

RELATED APPLICATION

This application is based on Japanese Patent Application No.2000-184360, the content of which is hereby incorporated by reference.

FIELD OF THE INVENTION

The present invention relates to a projection system, and specifically relates to a projection system provided with a digital micro-mirror device (DMD) as an optical modulation element.

DESCRIPTION OF THE RELATED ART

Digital micro-mirror devices (DMDs) have gained popularity as optical modulation elements for projection systems in recent years. DMDs have a surface of multiple micro-mirrors arranged in a matrix, and a single micro-mirror constitutes a single pixel of the surface image. The inclination of each micro-mirror is individually driven and controlled for optical modulation, and each micro-mirror has two inclination states corresponding to the ON state and the OFF state.

Illumination light is reflected toward the interior of the projection optical system by a micro-mirror in the ON state, and illumination light is reflected outwardly away from the projection optical system by a micro-mirror in the OFF state. Accordingly, only light reflected by the micro-mirror in the ON state arrives at the projection surface (e.g., screen) via the projection optical system, and as a result a display image comprising a shading pattern is formed on the projection surface.

Figure 13A:
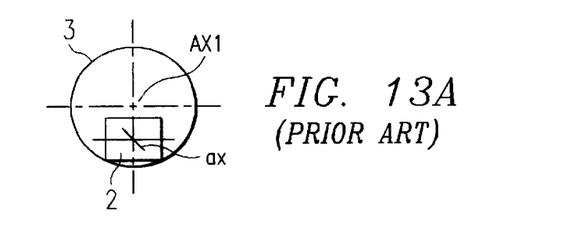
FIG. 13A shows the positional relationship between a DMD and an image circle via a projection optical system in a first conventional example.
Figure 13B:
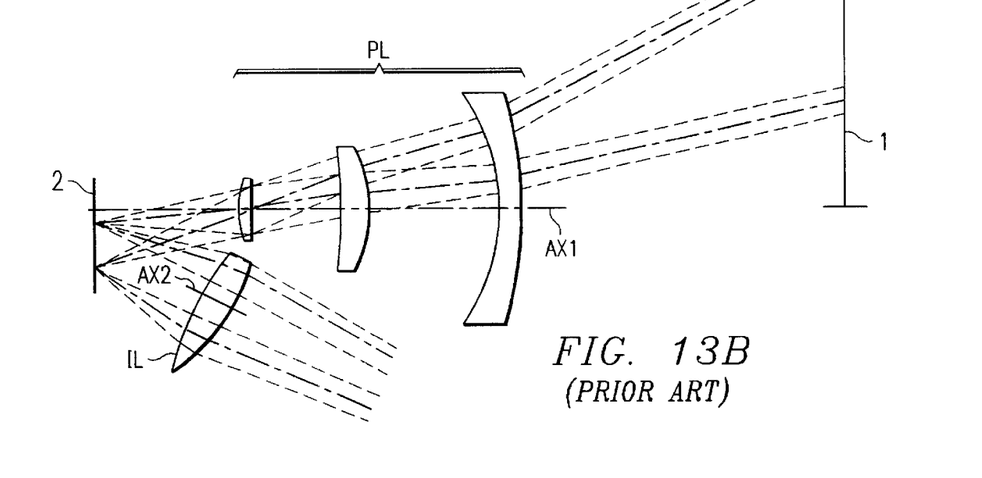
FIG. 13B is an optical structure diagram showing the essential part of the first conventional example of a projection system.

FIGS. 13A and 13B are optical structure diagrams of a first conventional example of a projection optical system provided with a DMD. FIG. 13A shows the positional relationship between a DMD 2 and an image circle 3 via a projection optical system PL; and FIG. 13B shows the essential part of the projection system viewed from a perpendicular direction relative to the optical axis AX1 of the projection optical system PL. The projection optical system PL has a non-telecentric structure, and the illumination optical system IL comprises a D-cut lens and the like (other lenses are omitted from the illustration). AX2 represents the optical axis of the illumination optical system IL.

Light passing through the illumination optical system IL illuminates the DMD 2 from an inclination of 45°. Since the DMD 2 is constructed such that each micro-mirror has two inclination states (ON state and OFF state) centered on the axis ax, light is reflected toward the projection optical system PL by micro-mirrors in the ON state, and light is reflected outwardly away from the projection optical system PL by the micro-mirrors in the OFF state. As a result, the light reflected by micro-mirrors in the ON state forms a display image on the projection surface 1.

Figure 14:
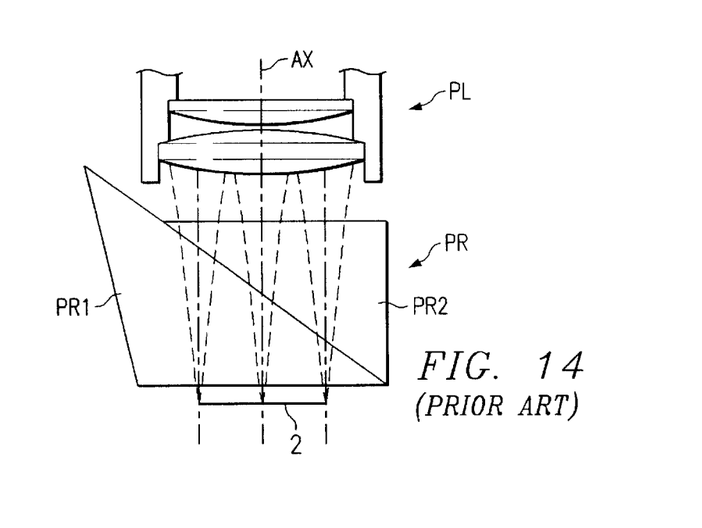
FIG. 14 is an optical structure diagram showing the essential part of a second conventional example of a projection system (ON state)
Figure 15:
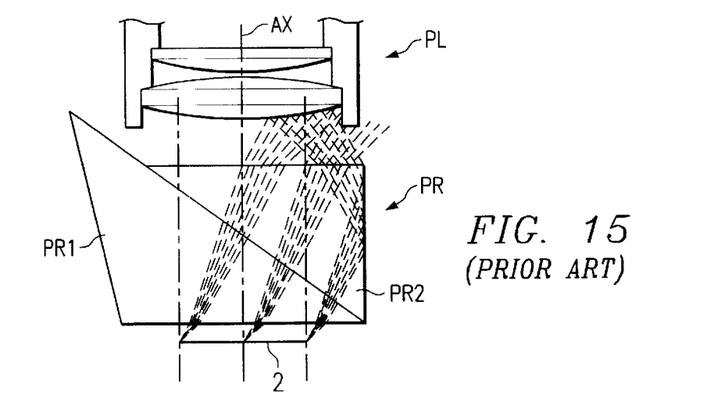
FIG. 15 is an optical structure diagram showing the essential part of the second conventional example of a projection system (OFF state)

FIGS. 14 and 15 are optical structure diagrams showing the essential part of a second conventional example of a projection optical system provided with a DMD. FIG. 14 shows the optical path of projection light when the micro-mirrors of a DMD 2 are in the ON state, and FIG. 15 shows the optical path of projection light when the micro-mirrors of DMD 2 are in the OFF state. This projection optical system is provided with a total internal refraction (TIR) prism PR comprising a first prism PR1, and a second prism PR2. PL represents the projection optical system, and AX represents the optical axis of the projection optical system.

When the DMD 2 mirror rotation angle, i.e., the rotation angle of the micro-mirrors comprising the DMD 2, is ±10°, the use of a TIR prism allows an overall telecentric structure having a maximum F-number of 3.0. Accordingly, light use efficiency is increased, and a bright projection image can be obtained.

Figure 16:
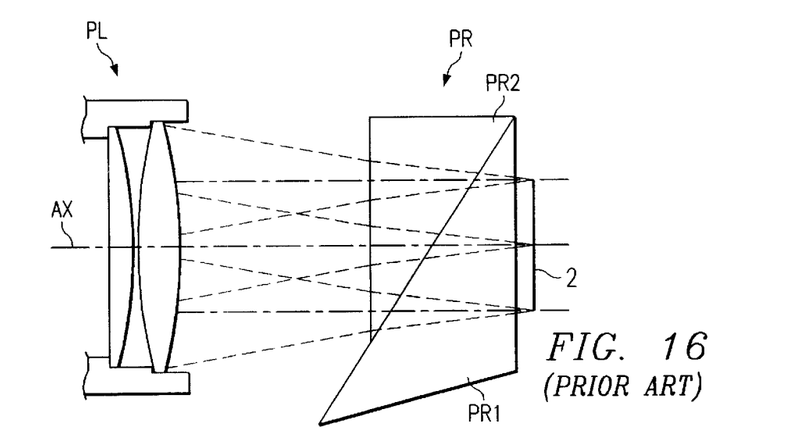
FIG. 16 is an optical structure diagram showing the essential part of a third conventional example of a projection system (ON state)
Figure 17:
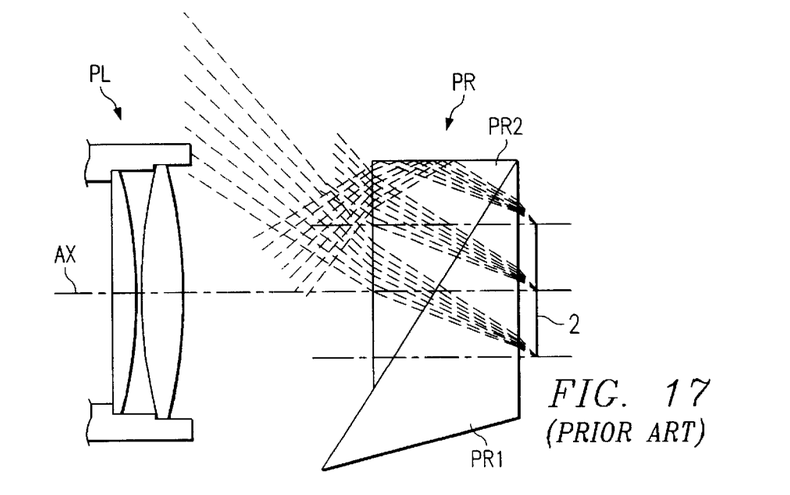
FIG. 17 is an optical structure diagram showing the essential part of the third conventional example of a projection system (OFF state).

FIGS. 16 and 17 are optical structure diagrams showing the essential part of a third conventional example of a projection system provided with a DMD. FIG. 16 shows the optical path of the projection light when the micro-mirrors of the DMD 2 are in the ON state, and FIG. 17 shows the optical path of the projection light when the micro-mirrors of the DMD 2 are in the OFF state. The third conventional example is constructed so as to ensure that the back length of the projection optical system PL is longer than that of the second conventional example. For this reason, light that is reflected by the micro-mirrors in the OFF state to a position near the projection optical system PL avoids entering the projection optical system PL.

In the structure of the first conventional example, however, as shown in FIG. 13A, only an extreme part of the array of the DMD 2 can be used in the image circle 3. For this reason, in projection systems of the rear projection type requiring a wide angle of field, it is difficult to have an inexpensive projection optical system PL. Although it is necessary to use a D-cut lens and rear stop in the projection optical system PL in order to avoid interference between the projection optical system PL and the illumination optical system IL, when a D-cut lens is used in the illumination optical system IL, it becomes difficult to achieve uniform illumination distribution, as shown in FIG. 13B.

In a projection system of a one-chip type having a short distance from the DMD to the projection optical system PL, as in the case of the second conventional example, among the light reflected by the micro-mirrors in the OFF state, the reflected light near the projection optical system PL and the light reflected by the interior surface on the side surface of the second prism PR2 enters the interior of the projection optical system PL. This reflected light becomes ghost light and is the cause of contrast reduction. In the telecentric structure on the DMD 2 side, it is difficult to reduce magnification color aberration due to the high position at which the light rays enter relative to the positive lens on the telecentric side.

In the third conventional example shown in FIGS. 16 and 17, because the lens-back length pf the projection optical system PL is longer than the system of the second conventional example, the projection optical system PL is larger, more costly, and magnification color aberration also is increased. As shown in FIG. 17, the light reflected to a position near the projection optical system PL is emitted outwardly away from the projection optical system PL, but light reflected on the interior surface by the side surfaces of the projection optical system PL enters the projection optical system PL. This reflected light is the cause of contrast reduction.

In the video projector disclosed in Japanese Laid-Open Patent No. H8-251520, a construction is used to return the light reflected by the micro-mirrors in the OFF state to the light source in order to eliminate these problems. However, contrast reduction by the inter-surface ghosts of shared parts cannot be avoided because of the shared parts of the illumination optical system IL and the projection optical system PL.

In the projection optical systems used in digital television, adequate increase in contrast, compactness of the projection optical system, low cost, and adequate correction of magnification color aberration are demanded. Recently, in particular, as the so-called start of the era of digital broadcasting neared, there has been increasing demand for compact, inexpensive, and high-performance rear projection type digital television optical systems. Rear projection digital television devices must be entirely thin and compact. Furthermore, the projection image must have high contrast, high resolution, and low distortion.

Although thinness of the overall device can be achieved by using a wide field angle projection system, in general the number of lenses must be increased and the lens total length and the lens diameter must be increased in order to simultaneously achieve wide angle and high performance, such that increased cost cannot be avoided. These influences are particularly pronounced in an optical system requiring a long lens-back regardless of wide angle or short focal length. Moreover, these difficulties are markedly increased when telecentric characteristics are required on the DMD side.

When wide angle is required in a 1-chip DMD projection system, generally a large TIR prism and telecentric characteristics are required. Specifically, in a projection optical system having a screen angle of 2ω=80°, the lens-back length must be approximately 2f~3f (where f is the focal length) by air conversion. This requirement inhibits the realization of a compact, inexpensive, high-performance digital video optical system of the rear projection type.

SUMMARY OF THE INVENTION

An object of the present invention is to provide an improved projection optical system.

In view of the previously described problems, an object of the present invention is to provide a projection system which is compact and capable of wide angle, and is a high-performance projection system producing a high contrast projection image.

These objects are attained by a projection system having the following construction A projection system, in accordance with the present invention, directs light from a light source to a TIR prism unit, optically modulates all light reflected by the TIR prism unit via reflection by a DMD, and projects the modulated light passing through the TIR prism unit onto the projection surface of the projection optical system The projection system has a function of smoothing the light from a light source via the illumination optical system. The TIR prism unit has a first prism for completely reflecting light emitted from the illumination optical system, and a second prism for transmitting light passing through the first prism after optical modulation by the DMD. The projection system also satisfies the following condition:

$$100 \leq Xa \leq 250$$

where $Xa$ (mm) represents the distance along an optical axis of the projection system from the DMD to an exit pupil of the illumination optical system on a DMD side of the illumination optical system.

BRIEF DESCRIPTION OF THE DRAWINGS

These and other objects and features of the invention will become clear from the following description taken in conjunction with the preferred embodiments with reference to the accompanying drawings, in which.

DESCRIPTION OF THE PREFERRED EMBODIMENTS

The embodiments of the present invention are described hereinafter with reference to the accompanying drawings. In the embodiments described below and in the conventional examples shown in FIGS. 13A~17, like and equivalent parts are designated by like reference numbers and duplicate description is omitted when appropriate.

Figure 1A:
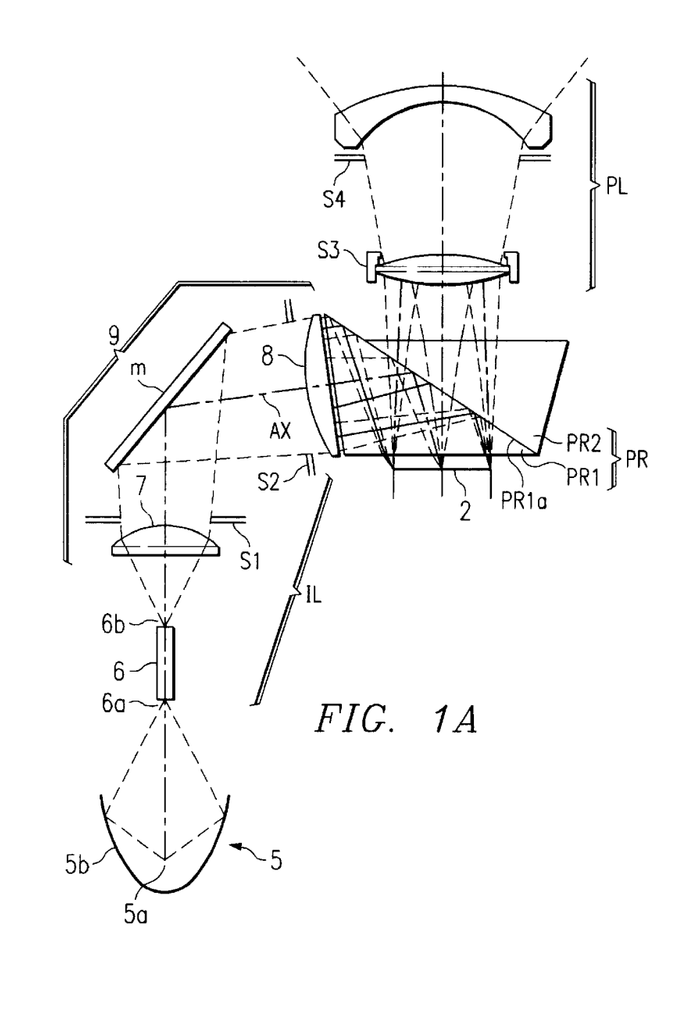
FIG. 1A is an optical structure diagram of an embodiment of the projection system of the present invention (ON state)
Figure 2:
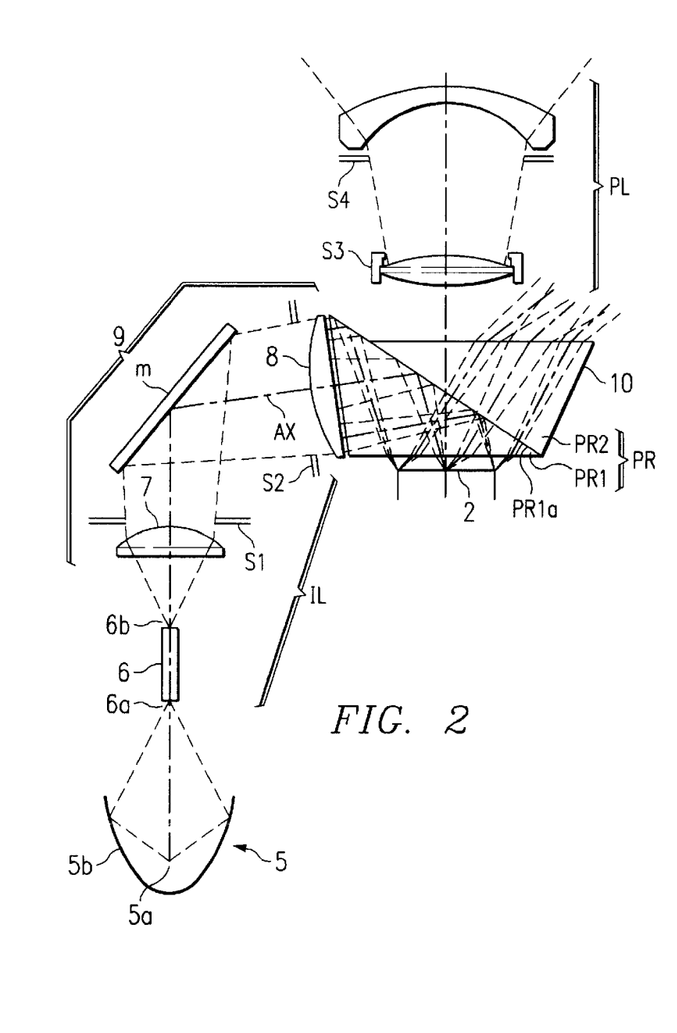
FIG. 2 is an optical structure diagram of the embodiment of the projection system of the present invention (OFF state)

FIGS. 1A and 2 are optical structure diagrams of an embodiment of the projection system of the present invention. FIG. 1A shows the optical path of the projection light when the micro-mirrors of the DMD 2 are in the ON state, and FIG. 2 shows the optical path of the projection light when the micro-mirrors of the DMD 2 are in the OFF state. The present embodiment is provided with a light source 5, an illumination optical system IL, a TIR prism unit PR, a DMD 2, and a projection optical system PL, and can be used as a digital television projection system.

Colorization of the projection image can be accomplished, for example, by arranging a rotatable color wheel (not illustrated) in the optical path. For example, a color wheel comprising color filters which transmit or reflect red (R), green (G), and blue (B) may be rotated in the optical path, such that projection color light is sequentially switched temporally.

In the present embodiment, a light source 5 comprises a lamp 5a, and a reflector 5b disposed so as to partially surround the lamp 5a. An integrator rod 6 is disposed lengthwise along the optical axis behind the light source 5 (top center in the drawing). Light emitted from the light source 5 is condensed and enters the entrance surface 6a of the integrator rod 6, and provides uniform illumination at the exit surface 6b.

Behind the integrator rod 6 is disposed a relay lens unit 9 comprising sequentially in the light travel direction a lens 7, a reflective mirror m, and a lens 8. The relay lens unit 9 is constructed so as to be approximately telecentric on the light source side, and non-telecentric on the DMD side. The reflective mirror m, arranged within the relay lens unit 9, operates to bend the optical axis to the right. A construction omitting the reflective mirror m may also be used.

The portion from the integrator rod 6 to the lens 8 is referred to as the illumination optical system IL. In the illumination optical system IL, illumination light emitted from the light source 5 is smoothed and rendered uniform by the integrator rod 6. Accordingly, both axial light and extra off-axial light are uniformly received on the surface of the DMD 2 due to the illumination light smoothing function That is, luminance distribution is uniform. The lenses and the like of the illumination optical system IL are partially omitted in the drawings.

The TIR prism unit PR comprises a first prism PR1 and a second prism PR2, and a small air gap is provided between the prisms. The TIR prism unit PR separates the input light and output light of the DMD 2. The first prism PR1 has a totally reflective surface PR1 a which completely reflects the light emitted from the illumination optical system IL. The light completely reflected by the first prism PR1 illuminates the DMD 2, and the illumination light is optically modulated via reflection by the DMD 2.

The second prism PR2 transmits the light transmitted through the first prism PR1 after modulation by the DMD 2. In this way, the DMD-modulated light transmitted through the TIR prism unit PR is projected onto a projection surface (not illustrated) by a projection optical system PL comprising a plurality of lenses and the like. That is, entrance of the light into the projection optical system PL and its projection therefrom only concerns light reflected by the micro-mirrors M in the ON state described later. The lenses and the like of the projection optical system PL are partially omitted from the drawings. In the present embodiment, the projection surface (not illustrated) is equivalent to a projection screen.

Along with a stop, each of the illumination optical system and the projection optical system are provided with a flux-regulating element, disposed in at least one location to regulate the amount of peripheral light. In the illumination optical system IL of the present embodiment, a flux-regulating element S1 is provided directly after the lens 7, and a flux-regulating element S2 is disposed directly in front of the lens 8. In the projection optical system PL, flux-regulating elements S3 and S4 are provided sequentially from the DMD 2 side. The stops are represented by SP1 and SP2 in the lens structure diagrams of the illumination optical system IL and the projection optical system PL.

Figure 3:
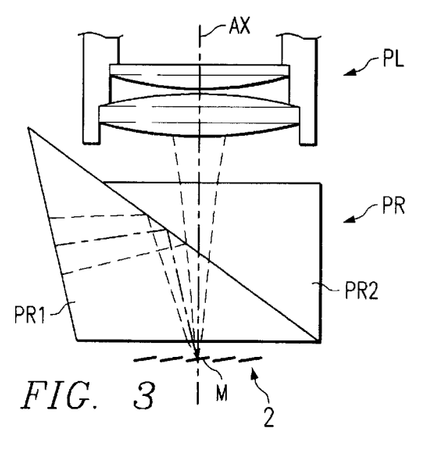
FIG. 3 is an optical structure diagram showing the optical path near the DMD in the projection system of the present invention (ON state)
Figure 4:
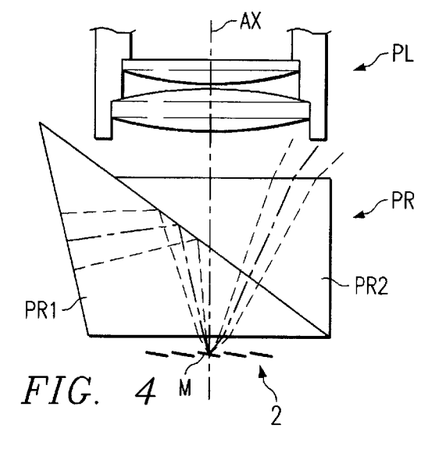
FIG. 4 is an optical structure diagram showing the optical path near the DMD in the projection system of the present invention (OFF state)

FIGS. 3 and 4 are optical structure diagrams showing the optical path near the DMD in the projection system of the present invention, and the optical modulation performed by the DMD is described in detail with reference to these drawings. FIG. 3 shows the optical path when the micro-mirrors M of the DMD 2 are in the ON state, and FIG. 4 shows the optical path when the micro-mirrors M of the DMD 2 are in the OFF state. The DMD 2 has a surface on which are arranged a plurality of micro-mirrors M in a matrix array, and a single micro-mirror M corresponds to a single pixel (e.g., 16 $\mu$m pitch).

The inclination of each micro-mirror M is individually driven and controlled, for example, at an inclination of the rotation angle ±10° for optical modulation, and each micro-mirror M has two inclination states including the ON state shown in FIG. 3 and the OFF state shown in FIG. 4. Illumination light is reflected toward the interior of the projection optical system PL by the micro-mirrors M in the ON state This reflected light is referred to as "ON light" hereinafter Illumination light is reflected outwardly away from the projection optical system PL by the micro-mirrors M in the OFF state. This reflected light is referred to as "OFF light" hereinafter.

Figure 1B:
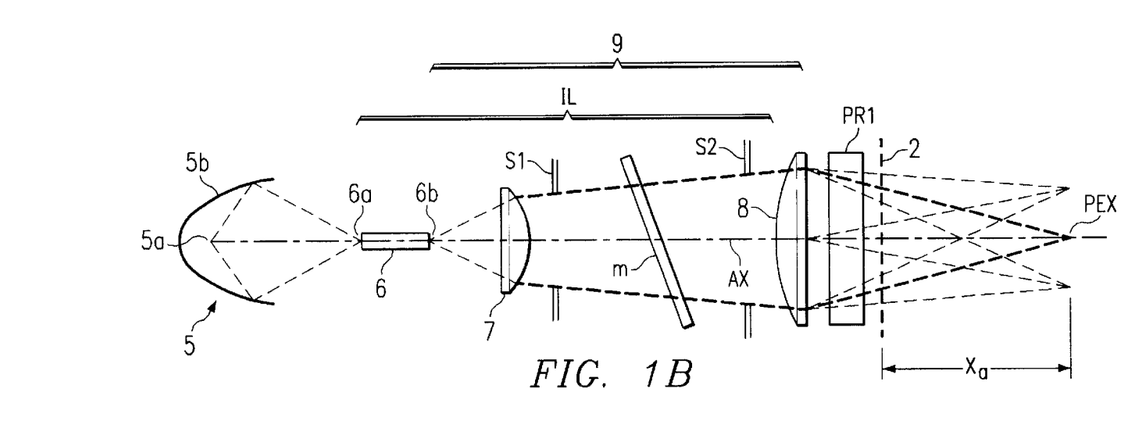
FIG. 1B is an optical structure diagram of a portion of the projection system shown in FIG. 1A.
Figure 1C:
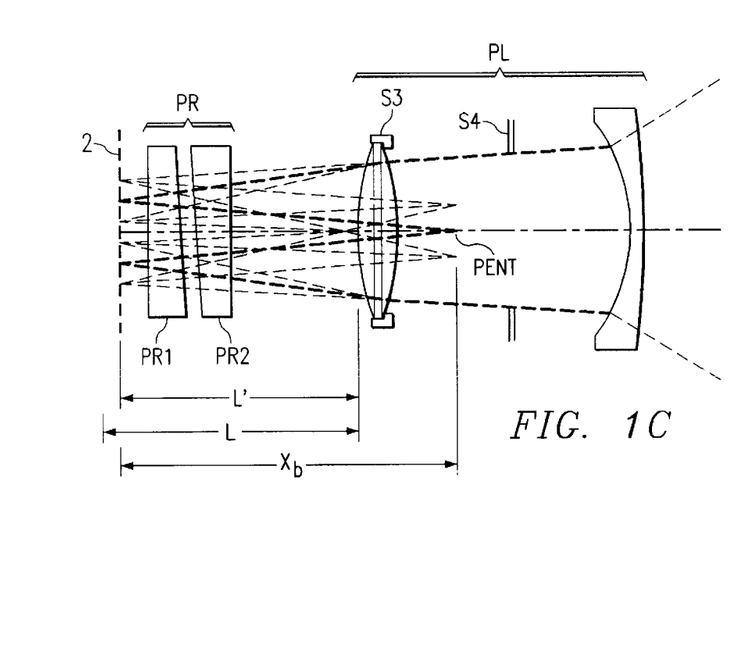
FIG. 1C is an optical structure diagram of a portion of the projection system shown in FIG. 1A.

FIG. 1B corresponds to a portion of FIG. 1A, with the optical axis AX unfolded, and aids in understanding the length Xa found in condition 1 that follows. Xa is defined as the distance along the optical axis of the projection system from the DMD 2 to an exit pupil Pex of the illumination optical system IL on a DMD 2 side of the illumination optical system IL. A pupil is defined as the intersecting point between the principle ray (the ray at the center of the luminous flux) and the optical axis. Therefore, the exit pupil of the illumination optical system IL is located at point Pex. FIG. 1C similarly corresponds to a portion of FIG. 1A with the optical axis AX unfolded. FIG. 1C Illustrates lengths Xb and L as found in conditions 4 and 7 respectively. Xb is defined as the distance along the optical axis of the projection system from an entrance pupil Pent of the projection optical system PL, on a DMD 2 side of the projection optical system PL, to the DMD 2. The distance L is the lens-back focal length of the projection optical system by air conversion. The DMD 2 is located a distance corresponding to an effective lens-back focal length L' from the projection optical system PL. However, due to the intervening prism PR, with an refractive index greater than 1, the effective lens-back focal length L' is less than the lens-back focal length by air conversion L as illustrated.

When the light is transmitted in a non-telecentric state between the illumination optical system IL and the projection optical system PL, it is desirable that the F-number on the DMD 2 side and the pupil position on the DMD 2 side satisfies the following condition.

$$100 \leq Xa \leq 250 \tag{1}$$

Where Xa (mm) represents the distance along an optical axis of the projection system from the DMD to an exit pupil of the illumination optical system on a DMD side of the illumination optical system.

When the upper limit of condition (1) is exceeded, the angle of the main light ray approaches telecentric on the DMD 2 side of the illumination optical system IL. That is, it is difficult to separate the ON light and the OFF light within the TIR prism unit PR because the distance from the pupil to the DMD 2 nears infinity, and the OFF light enters the projection optical system PL For this reason, contrast is reduced. When the value of Xa is less than the lower limit of condition (1), the angle of the main light ray on the DMD 2 side of the illumination optical system IL increases from telecentric, such that part of the illumination light within the TIR prism unit PR is emitted as light which does not satisfy the condition of complete reflection. Therefore, only a little light enters the projection optical system PL as ON light, and the projection is dark.

It is further desirable that condition (2) below is satisfied.

$$2 \leq Fa \leq 4 \tag{2}$$

Where Fa represents the F-number on the DMD side of the illumination optical system. When the lower limit of condition (2) is exceeded, the cost increases due to the use of a DMD of extremely high performance. When the upper limit is exceeded, light cannot be used efficiently, and the projection image is dark.

It is further desirable that condition (3) below is satisfied.

$$-1.5 \leq Ua \leq 7.5 \tag{3}$$

Where Ua (°) represents the angle formed by the optical axis and the upper ray at the periphery of the illumination optical system. The upper ray is described below.

Figure 5:
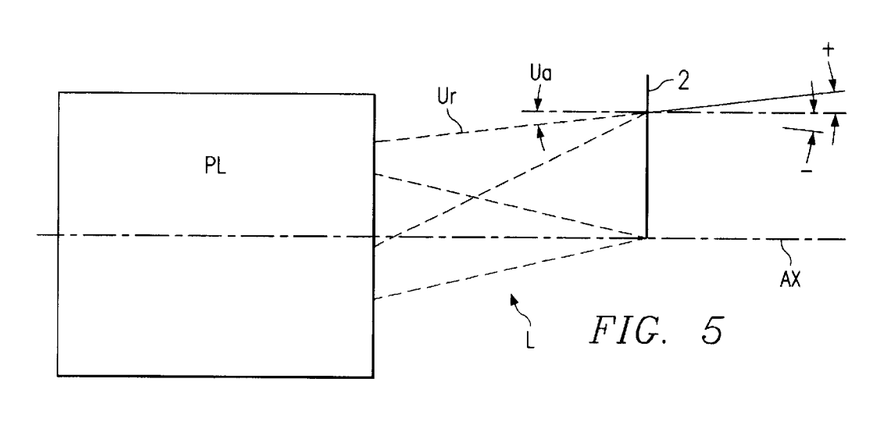
FIG. 5 is a schematic drawing defining the upper ray direction.

FIG. 5 schematically shows the definition of the upper ray direction, in an example of the projection optical system. In the drawing, if the upper ray of light passing through the outermost side at the image height is designated Ur within the light L advancing from the DMD 2 in the direction of the projection optical system PL, then the angle Ua formed by the optical axis Ax and the upper ray Ur when the ray Ur is inclined on the interior side relative to the projection optical system is designated a positive value (+), and conversely, the angle Ua when the ray Ur is inclined on the exterior side is designated a negative value (−). The signs of the upper ray from the projection optical system toward the DMD 2 are reversed.

It is desirable that condition (4) below is satisfied.

$$100 \leq Xb \leq 250 \tag{4}$$

Where Xb (mm) represents the distance along the optical axis of the projection system from an entrance pupil of the projection optical system, on a DMD side of the projection optical system, to the DMD.

When the upper limit of condition (4) is exceeded, the angle of the main ray on the DMD side of the projection optical system PL approaches telecentric. That is, the light rays passing through the final surface of the projection optical system PL separates from the optical axis AX because the distance from the pupil to the DMD 2 approaches infinity. For this reason, it becomes particularly difficult to correct magnification color aberration and distortion. The projection optical system PL also becomes larger. When the lower limit of condition (4) is exceeded, part of the usable light rays that should be received by the projection optical system PL do not satisfy the condition of complete reflection For this reason, fewer of the light rays enter the projection optical system as ON light, and the projection is dark.

It is further desirable that condition (5) below is satisfied.

$$2 \leq Fb \leq 4 \tag{5}$$

Where Fb represents the F-number on the DMD side of the projection optical system. When the lower limit of condition (5) is exceeded, costs increase due to the use of an extremely high performance DMD. When the upper limit is exceeded, light cannot be used efficiently, and the projection image is dark.

It is further desirable that condition (6) below is satisfied.

$$-7.5 \leq Ub \leq 1.5 \tag{6}$$

Where Ub (°) represents the angle formed by the optical axis and the upper ray at the periphery of the projection optical system.

It is further desirable that condition (7) below is satisfied.

$$1.5f \leq L \leq 4.6f \tag{7}$$

Where f (mm) represents the focal length of the projection optical system, and L (mm) represents the lens-back length of the projection optical system by air conversion.

In a projection system using a TIR prism unit and DMD 2 as in the present embodiment, when the F-number is increased on the DMD 2 side of the illumination optical system, i.e., the system is darker, the pupil position is shorter on the DMD side, and telecentricity is not used, the reduced contrast caused by the influence of ON light and OFF light (unnecessary light) can be improved. That is, the contrast for televisions can be greatly improved and a high quality projection image can be obtained, for example, by adapting the projection system of the present embodiment for digital television.

In the present embodiment, in particular, it is possible for the projection optical system to achieve an even wider angle by matching the pupil position and peripheral flux of the projection optical system to the illumination optical system. By matching the pupil position setting, the TIR prism unit can be made more compact (about 30% smaller in external diameter than a conventional prism) to realize a compact projection optical system having a wide angle of 2ω=85°. When the present invention is adapted to so-called rear projection television, a thin overall device can be achieved by the wide angle of the projection optical system. Furthermore, high contrast can be realized by effectively cutting the particularly harmful light rays in the OFF light by employing the previously described flux-regulating element.

The TIR prism unit PR used in the present embodiment has second prism PR2 having a shape that does not allow the light reflected from the DMD 2 to reflect on internal surfaces of the second prism PR2, i.e., the second prism PR2 has a triangular shape projecting perpendicular to the optical axis AX on the projection optical system PL side. In the conventional examples shown in FIGS. 13A~17 OFF light is reflected by the internal side surface in the second prism PR2 and enters the projection optical system PL because the side surface of the second prism PR2 is parallel to the optical axis AX. However, if the side surface 10 of the second prism PR2 is inclined relative to the optical axis AX, such that a distance between the side surface 10 and the optical axis AX increases in a direction from the DMD 2 to the projection optical system PL, as shown in FIG. 2, the OFF light does not impinge the side surface 10, such that the OFF light is not reflected by the internal surface of the second prism PR2 and avoids entering the projection optical system PL. Accordingly, contrast reduction caused by internal surface reflection of the OFF light is prevented.

Figure 6:
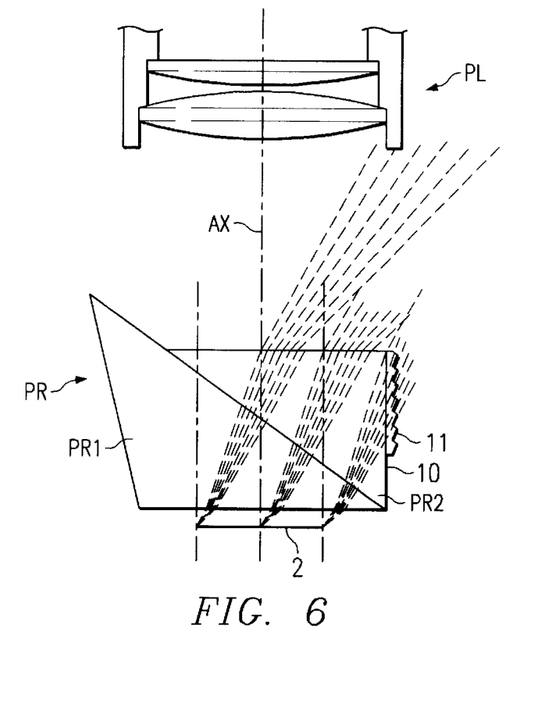
FIG. 6 illustrates the operation of the TIR prism unit cemented to a sheet having a serrated cross section.

Instead of inclining the side surface 10 of the second prism PR2 as described above, a sheet 11 having a serrated cross section configuration (e.g., a Fresnel shape) may be cemented to the side surface 10, which is impinged by the OFF light reflected by the DMD 2 as shown in FIG. 6. If the serrated sheet 11 is cemented to the side surface 10 of the second prism PR2, the OFF light that impinges the side surface 10 is transmitted through the side surface 10 and the sheet 11. Accordingly, reflection of OFF light on internal surfaces of the second prism PR2 that causes the OFF light to enter the projection optical system PL can be avoided. The use of sheet 11 also prevents contrast reduction caused by internal reflection of the OFF light, and makes possible a more compact and light weight second prism PR2.

Figure 7:
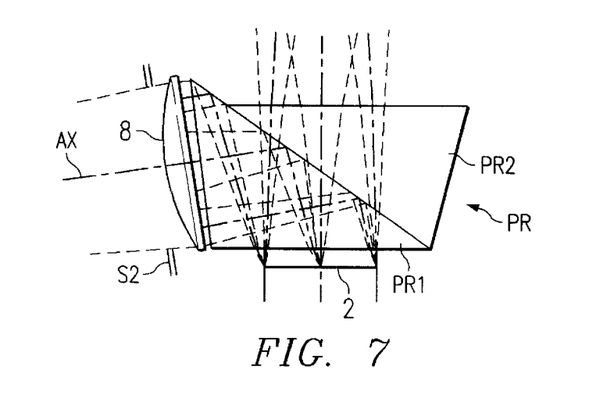
FIG. 7 shows a construction wherein the DMD side lens of the illumination system is inclined relative to the optical axis.

Furthermore, the lens 8 closest to the DMD 2 side of the illumination optical system IL may be inclined relative to the optical axis AX as shown in FIG. 7. In this way, the focus state of the illumination area is improved by inclining the optical element on the DMD 2 side of the illumination optical system IL. Accordingly, light use efficiency is improved and a bright projection image is obtained.

The construction of the projection system of the present invention is described specifically below in terms of construction data of the optical system. The optical systems of examples 1 and 2 correspond to the illumination optical system IL and the projection optical system PL of the previously described embodiment, and the optical system of example 3 corresponds to the projection optical system PL of an embodiment applied to an example of a zoom lens.

Figure 8:
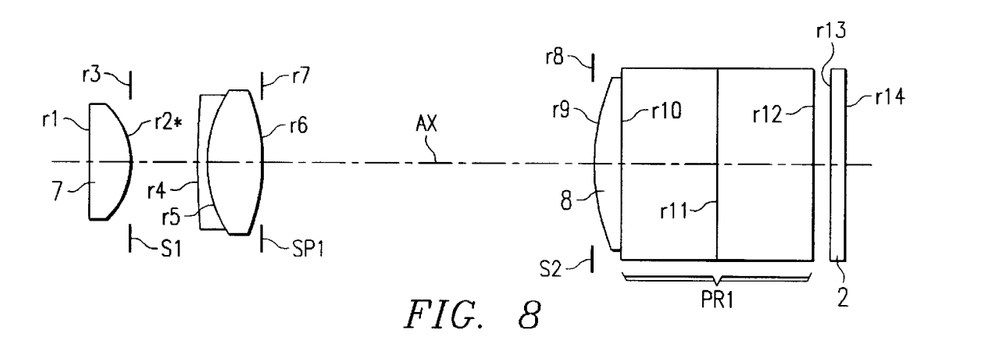
FIG. 8 shows a first example of the lens structure of the illumination optical system of the projection system of the present invention.
Figure 9:
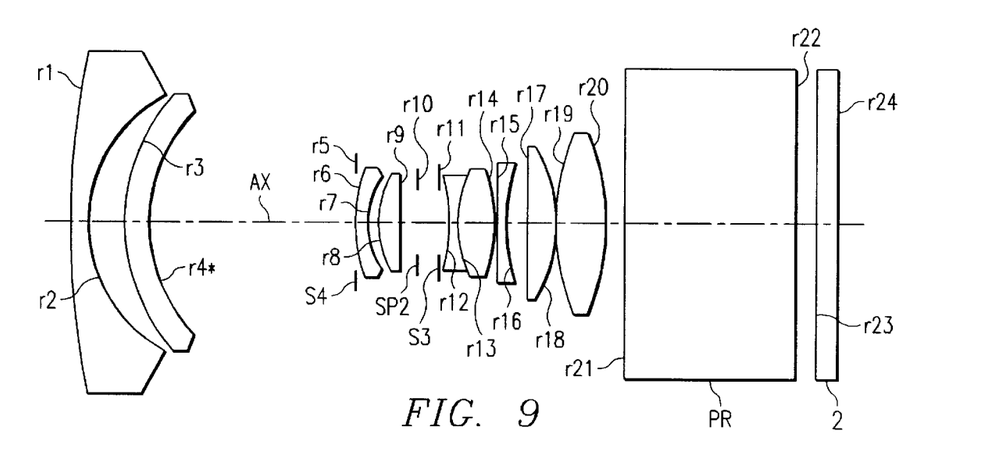
FIG. 9 shows a first example of the lens structure of the projection optical system of the projection system of the present invention.
Figure 10:
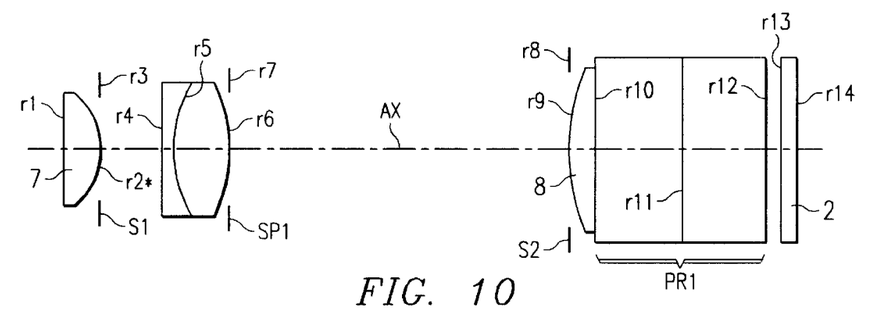
FIG. 10 shows a second example of the lens structure of the illumination optical system of the projection system of the present invention.
Figure 11:
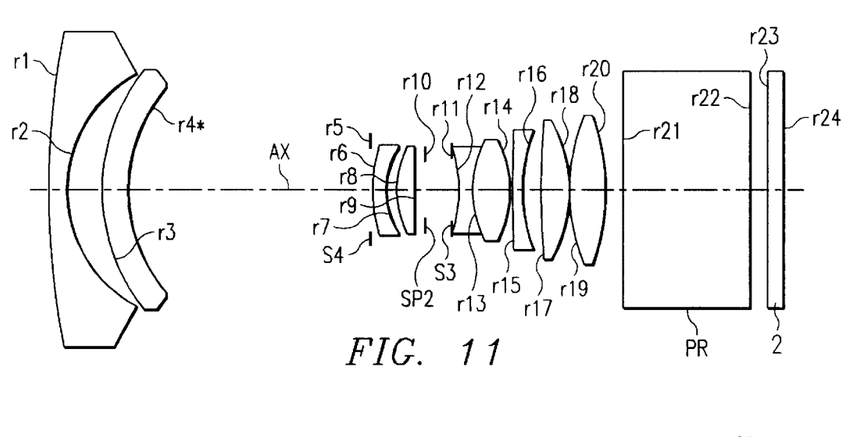
FIG. 11 shows a second example of the lens structure of the projection optical system of the projection system of the present invention.
Figure 12:
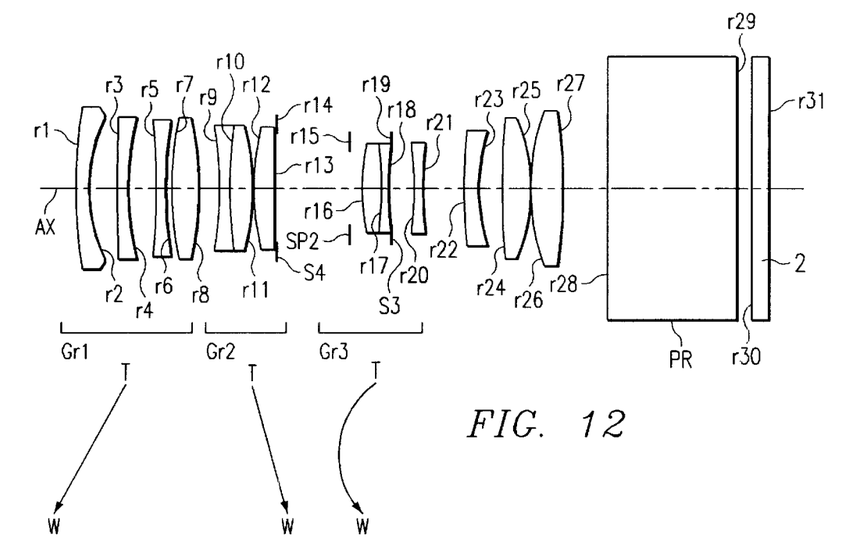
FIG. 12 shows a third example of the lens structure of the projection optical system of the present invention applied to a zoom lens.

FIG. 8 shows the lens structure of an illumination optical system IL of example 1, and FIG. 9 shows the lens structure of a projection optical system PL of example 1. FIG. 10 shows the lens structure of an illumination optical system IL of example 2, and FIG. 11 shows the lens structure of a projection optical system PL of example 2. FIG. 12 shows the lens structure of a projection optical system PL of example 3. In the drawings, the left side of the illumination optical system IL is the light source 5 side, and the left side of the projection optical system PL is the projection side.

The plate arranged at the right end of each optical system corresponds to the cover glass of the DMD 2. The arrows in FIG. 12 schematically represent the element movement from the telephoto end to the wide angle end of the first lens unit Gr1, second lens unit Gr2, and third lens unit Gr3 during zooming. This drawing shows the zoom lens at the telephoto end.

In each example, ri (i=1, 2, 3, ... ) represents the number i surface and its radius of curvature (mm) counting from the projection side or the light source 5 side, di (i=1, 2, 3, ... ) represents the axial spacing (mm) of the number i surface counting from the projection side or the light source 5 side, Ni (i=1, 2, 3, ... ) and vi (i=1, 2, 3, ... ) respectively represent the d-line refractive index and Abbe number of the number i lens counting from the projection side or the light source 5 side. In the examples, the DMD 2 mirror rotation angle is ±10°.

In the projection optical system PL of the third example, the focal length f, F-number Fb, distance (d8) between the first lens unit and the second lens unit, distance (d14) between the second lens unit and the third lens unit, and spacing (d21) between the third lens unit and subsequent lens system correspond to values sequentially from the left at the telephoto end (T), middle (M), and wide angle end (W). In the examples, an asterisk mark (*) appended to a radius of curvature indicates an aspherical surface, and equation expressing the shape of the aspherical surface is defined below.

$$X = X0 + \Sigma Ai Y^i \quad \text{(a)}$$

$$X0 = CY^2 / \{1 + (1 - \epsilon C^2 Y^2)^{1/2}\} \quad \text{(b)}$$

Where X represents the displacement from a standard surface in the optical axis direction (surface apex standard), Y represents the height in a direction perpendicular to the optical axis, C represents the paraxial curvature, $\epsilon$ represents the secondary curvature parameter, and Ai represents the aspherical surface coefficient of the i degree.

[Radius of Curvature]　　　　[Refractive Index (Nd)]
　[Axial Distance]　　　　　　　　　　[Abbe Number (vd)]

[Illumination Optical System (IL) of First Embodiment]
Xa = 143 mm, Fa = 3.0, Ua = 4.2# r1 = ∞
　d1 = 8.000　　　　　N1 = 1.52307　v1 = 58.57
r2* = −14.680
　d2 = 0.0
r3 = ∞(S1 φ21.4 mm)
　d3 = 14.000
r4 = 318.894
　d4 = 1.500　　　　　N2 = 1.75520　v2 = 27.53
r5 = 23.100
　d5 = 12.000　　　　N3 = 1.62041　v3 = 60.34
r6 = −29.123
　d6 = 0.0
r7 = ∞(Diaphragm SP1 φ24.43 mm)
　d7 = 100.000
r8 = ∞(S2 φ31.1 mm)
　d8 = 0.0
r9 = 39.739
　d9 = 5.000　　　　　N4 = 1.62041　v4 = 60.34
r10 = ∞
　d10 = 19.207　　　　N5 = 1.51680　v5 = 64.20
r11 = ∞
　d11 = 19.601　　　　N6 = 1.51680　v6 = 64.20
r12 = ∞
　d12 = 3.404
r13 = ∞
　d13 = 2.827　　　　　N7 = 1.47069　v7 = 67.39
r14 = ∞
[Aspherical Coefficient of Second Surface (r2)]
$\epsilon$ = 0.50000

[Projection Optical System (PL) of First Embodiment]
Xb = 123 mm, Fb = 3.0, Ub = −4.4#, L = 2 3f, f = 10.604 mm r1 = 102.093
　d1 = 2.500　　　　　N1 = 1.49700　v1 = 81.61
r2 = 18.897
　d2 = 5.200
r3 = 24.049
　d3 = 3.500　　　　　N2 = 1.49300　v2 = 58.34
r4* = 14.977
　d4 = 35.000
r5 = ∞(S4 φ13.4 mm)
　d5 = 0.0
r6 = 22.125
　d6 = 1.700　　　　　N3 = 1.61800　v3 = 63.39
r7 = 10.676
　d7 = 1.600
r8 = 13.113
　d8 = 3.000　　　　　N4 = 1.75520　v4 = 27.53
r9 = 313.074
　d9 = 2.200
r10 = ∞(DiaphragmSP2 φ8.32 mm)
　d10 = 3.000
r11 = ∞(S3 φ9.2 mm)
　d11 = 1.300
r12 = −26.785
　d12 = 1.300　　　　　N5 = 1.75520　v5 = 27.53
r13 = 15.268
　d13 = 5.200　　　　　N6 = 1.61800　v6 = 63.39
r14 = −21.152
　d14 = 0.500
r15 = −402.914
　d15 = 1.000　　　　　N7 = 1.68150　v7 = 36.64
r16 = 21.671
　d16 = 3.000
r17 = 663.887

-continued

| [Radius of Curvature]<br>[Axial Distance] | [Refractive Index (Nd)]<br>[Abbe Number (vd)] | |
|---|---|---|
| d17 = 4.000 | N8 = 1.49310 | v8 = 83.58 |
| r18 = −20.309 | | |
| d18 = 0.300 | | |
| r19 = 29.119 | | |
| d19 = 6.900 | N9 = 1.49310 | v9 = 83.58 |
| r20 = −29.298 | | |
| d20 = 3.000 | | |
| r21 = ∞ | | |
| d21 = 24.000 | N10 = 1.51680 | v10 = 64.20 |
| r22 = ∞ | | |
| d22 = 3.200 | | |
| r23 = ∞ | | |
| d23 = 2.750 | N11 = 1.47069 | v11 = 67.39 |
| r24 = ∞ | | |

[Aspherical Coefficient of Fourth Surface (r4)]
$\epsilon = 0.20000$
$A4 = -0.16282 \times 10^{-4}$
$A6 = -0.28393 \times 10^{-7}$
$A8 = -0.86959 \times 10^{-10}$

[Illumination Optical System (IL) of Second Embodiment]
Xa = 243 mm, Fa = 3.0, Ua = 6.1#

| | | |
|---|---|---|
| r1 = ∞ | | |
| d1 = 8.000 | N1 = 1.52307 | v1 = 58.57 |
| r2* = −14.186 | | |
| d2 = 0.0 | | |
| r3 = ∞(S1 φ21.4 mm) | | |
| d3 = 14.000 | | |
| r4 = 273.434 | | |
| d4 = 1.800 | N2 = 1.75520 | v2 = 27.53 |
| r5 = 22.100 | | |
| d5 = 12.400 | N3 = 1.62041 | v3 = 60.34 |
| r6 = −28.106 | | |
| d6 = 0.0 | | |
| r7 = ∞(Diaphragm SP1 φ24.4 mm) | | |
| d7 = 90.000 | | |
| r8 = ∞(S2 φ30.6 mm) | | |
| d8 = 0.0 | | |
| r9 = 42.200 | | |
| d9 = 5.500 | N4 = 1.62041 | v4 = 60.34 |
| r10 = ∞ | | |
| d10 = 19.207 | N5 = 1.51680 | v5 = 64.20 |
| r11 = ∞ | | |
| d11 = 19.601 | N6 = 1.51680 | v6 = 64.20 |
| r12 = ∞ | | |
| d12 = 3.404 | | |
| r13 = ∞ | | |
| d13 = 2.827 | N7 = 1.47069 | v7 = 67.39 |
| r14 = ∞ | | |

[Aspherical Coefficient of Second Surface (r2)]
$\epsilon = 0.50000$

[Projection Optical System (IL) of Second Embodiment]
Xb = 233 mm, Fb = 3.0, Ub = −6.4#, L = 2.8f, f = 10.6 mm

| | | |
|---|---|---|
| r1 = 121.131 | | |
| d1 = 3.300 | N1 = 1.49700 | v1 = 81.61 |
| r2 = 22.354 | | |
| d2 = 6.600 | | |
| r3 = 31.402 | | |
| d3 = 4.400 | N2 = 1.49300 | v2 = 58.34 |
| r4* = 17.982 | | |
| d4 = 45.300 | | |
| r5 = ∞(S4 φ13.6 mm) | | |
| d5 = 0.0 | | |
| r6 = 26.817 | | |
| d6 = 2.300 | N3 = 1.61800 | v3 = 63.39 |
| r7 = 13.161 | | |
| d7 = 2.000 | | |
| r8 = 16.406 | | |
| d8 = 3.200 | N4 = 1.75520 | v4 = 27.53 |
| r9 = 8954.958 | | |
| d9 = 2.000 | | |
| r10 = ∞(Diaphragm SP2 φ9.06 mm) | | |
| d10 = 5.000 | | |
| r11 = ∞(S3 φ10.6 mm) | | |
| d11 = 1.100 | | |

-continued

| [Radius of Curvature]<br>[Axial Distance] | [Refractive Index (Nd)]<br>[Abbe Number (vd)] | |
|---|---|---|
| r12 = −25.410 | | |
| d12 = 2.300 | N5 = 1.75520 | v5 = 27.53 |
| r13 = 19.294 | | |
| d13 = 6.500 | N6 = 1.61800 | v6 = 63.39 |
| r14 = −20.547 | | |
| d14 = 0.670 | | |
| r15 = 186.679 | | |
| d15 = 1.700 | N7 = 1.68150 | v7 = 36.64 |
| r16 = 24.261 | | |
| d16 = 3.500 | | |
| r17 = 120.686 | | |
| d17 = 4.800 | N8 = 1.49310 | v8 = 83.58 |
| r18 = −29.273 | | |
| d18 = 0.300 | | |
| r19 = 29.605 | | |
| d19 = 6.800 | N9 = 1.49310 | v9 = 83.58 |
| r20 = −42.262 | | |
| d20 = 3.000 | | |
| r21 = ∞ | | |
| d21 = 24.000 | N10 = 1.51680 | v10 = 64.20 |
| r22 = ∞ | | |
| d22 = 3.200 | | |
| r23 = ∞ | | |
| d23 = 2.750 | N11 = 1.47069 | v11 = 67.39 |
| r24 = ∞ | | |

[Aspherical Coefficient of Fourth Surface (r4)]
$\epsilon = 0.20000$
$A4 = -0.10852 \times 10^{-4}$
$A6 = -0.15264 \times 10^{-7}$
$A8 = -0.23190 \times 10^{-10}$

[Projection Optical System (PL) of Third Embodiment]
Telephoto end Xb = 113 mm, Fb = 4.0, Ub = −1.2#
Wide-angle end Xb = 113 mm, Fb = 4.0, Ub = −1.4#
f = 32.28 mm~28.495 mm~24.856 mm

| | | |
|---|---|---|
| r1 = 70.274 | | |
| d1 = 1.900 | N1 = 1.71300 | v1 = 53.93 |
| r2 = 23.767 | | |
| d2 = 4.900 | | |
| r3 = 283.526 | | |
| d3 = 1.700 | N2 = 1.71300 | v2 = 53.93 |
| r4 = 38.470 | | |
| d4 = 4.800 | | |
| r5 = −91.051 | | |
| d5 = 1.700 | N3 = 1.71300 | v3 = 53.93 |
| r6 = 68.457 | | |
| d6 = 0.900 | | |
| r7 = 51.780 | | |
| d7 = 4.600 | N4 = 1.7440 | v4 = 44.93 |
| r8 = −50.891 | | |
| d8 = 3.648□10.129□17.981 | | |
| r9 = −55.047 | | |
| d9 = 1.700 | N5 = 1.76182 | v5 = 26.61 |
| r10 = 78.453 | | |
| d10 = 3.800 | N6 = 1.71300 | v6 = 53.93 |
| r11 = −40.154 | | |
| d11 = 0.300 | | |
| r12 = 34.181 | | |
| d12 = 3.500 | N7 = 1.71300 | v7 = 53.93 |
| r13 = −533.561 | | |
| d13 = 0.0 | | |
| r14 = ∞(S4 φ16.6 mm) | | |
| d14 = 8.292□4.824□1.700 | | |
| r15 = ∞(Diaphragm SP2 φ11.74 mm) | | |
| d15 = 3.000 | | |
| r16 = 31.585 | | |
| d16 = 3.000 | N8 = 1.76182 | v8 = 26.61 |
| r17 = −88.687 | | |
| d17 = 1.200 | N9 = 1.62041 | v9 = 60.29 |
| r18 = 42.918 | | |
| d18 = 0.500 | | |
| r19 = ∞(S3 φ12.0 mm) | | |
| d19 = 3.800 | | |
| r20 = −83.988 | | |
| d20 = 1.500 | N10 = 1.84666 | v10 = 23 78 |
| r21 = 39.900 | | |

-continued

| [Radius of Curvature] [Axial Distance] | [Refractive Index (Nd)] | [Abbe Number (vd)] |
|---|---|---|
| d21 = 7.000☐7.300☐7.000 | | |
| r22 = 63.188 | | |
| d22 = 2.600 | N11 = 1.84666 | v11 = 23.78 |
| r23 = 25.353 | | |
| d23 = 4 000 | | |
| r24 = 136.107 | | |
| d24 = 4.300 | N12 = 1.49310 | v12 = 83.58 |
| r25 = −31.287 | | |
| d25 = 0.240 | | |
| r26 = 31.760 | | |
| d26 = 5.500 | N13 = 1.49310 | v13 = 83.58 |
| r27 = −82.575 | | |
| d27 = 7.300 | | |
| r28 = ∞ | | |
| d28 = 22.000 | N14 = 1.51680 | v14 = 64.20 |
| r29 = ∞ | | |
| d29 = 3.000 | | |
| r30 = ∞ | | |
| d30 = 2.750 | N15 = 1.50847 | v15 = 61.19 |
| r31 = ∞ | | |

According to the above description, the present invention provides a projection system which is compact and achieves wide angle, and further provides high performance and a high contrast projection image.

Although the present invention has been filly described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A projection system, comprising:
   a light source;
   an illumination optical system for receiving light from said light source;
   an optical modulation element;
   a projection optical system; and
   a prism unit for reflecting light from said illumination optical system to said optical modulation element and for transmitting light from said optical modulation element to said projection optical system,
   wherein the following condition is satisfied:

$100 \leq Xa \leq 250$, where Xa (mm) represents a distance along an optical axis of the projection system from said optical modulation element to an exit pupil of said illumination optical system on an optical modulation element side of said illumination optical system.

2. A projection system, according to claim 1, wherein said projection optical system is a zoom lens system.

3. A projection system, according to claim 1, wherein said illumination optical system is provided with at least one flux-regulating element for regulating an amount of peripheral light in said illumination optical system, and said projection optical system is provided with at least one flux-regulating element for regulating an amount of peripheral light in said projection optical system.

4. A projection system, according to claim 1, wherein said optical modulation element has an ON inclination state and an OFF inclination state, wherein light is reflected toward an interior portion of said projection optical system by said optical modulation element in an ON inclination state and light is reflected outwardly away from said projection optical system by said optical modulation element in an OFF inclination state.

5. A projection system, according to claim 1, wherein an optical element in said illumination optical system that is closest to said optical modulation element is positioned at an incline relative to the optical axis of the projection system.

6. A projection system, according to claim 1, wherein the following condition is satisfied:

$2 \leq Fa \leq 4$, where Fa represents the F-number on an optical modulation element side of said illumination optical system.

7. A projection system, according to claim 1, wherein the following condition is satisfied:

$-1.5 \leq Ua \leq 7.5$, where Ua represents an angle (in degrees) formed by said optical axis and an upper ray of light at a peripheral region of said illumination optical system.

8. A projection system, according to claim 1, wherein the following condition is satisfied:

$100 \leq Xb \leq 250$, where Xb (mm) represents a distance along said optical axis of the projection system from an entrance pupil of said projection optical system, on an optical modulation element side of said projection optical system, to said optical modulation element.

9. A projection system, according to claim 1, wherein the following condition is satisfied:

$2 \leq Fb \leq 4$, where Fb represents a F-number on an optical modulation element side of said projection optical system.

10. A projection system, according to claim 1, wherein the following condition is satisfied:

$-7.5 \leq Ub \leq 1.5$, where Ub represents an angle (in degrees) formed by said optical axis and an upper ray of light at a peripheral region of said projection optical system.

11. A projection system, according to claim 1, wherein the following condition is satisfied:

$1.5f \leq L \leq 4.6f$, where f (mm) represents a focal length of said projection optical system, and
    L (mm) represents a lens-back length of said projection optical system.

12. A projection system, according to claim 1, wherein said prism unit comprises a first prism and a second prism with an air gap provided therebetween.

13. A projection system, according to claim 12, wherein said first prism has a reflective surface which can reflect light from said illumination optical system to a surface of said optical modulation element and said second prism can transmit light that has passed through said first prism to said projection optical system.

14. A projection system, according to claim 12, wherein said second prism has a triangular shape, and is positioned such that light that is reflected by said optical modulation element does not reflect on an internal surface of said second prism.

15. A projection system, according to claim 14, wherein a side surface of said second prism is inclined relative to an optical axis of the projection system.

16. A projection system, according to claim 14, wherein said second prism is provided with an element on a side surface thereof, said element having a serrated cross-sectional configuration.

17. A projection system, comprising:

a light source;

an optical modulation element;

an illumination optical system defining an optical path from said light source to said optical modulation element;

a projection optical system defining an optical path from said optical modulation element in a direction of a projection surface, wherein the following condition is satisfied $$100 \leq Xa \leq 250,$$

where Xa (mm) represents a distance along an optical axis of the projection system from said optical modulation element to an exit pupil of said illumination optical system on an optical modulation element side of said illumination optical system.

18. A projection system, according to claim 17, wherein said projection optical system is a zoom lens system.

19. A projection system, according to claim 17, wherein said illumination optical system is provided with at least one flux-regulating element for regulating an amount of peripheral light in said illumination optical system and said projection optical system is provided with at least one flux-regulating element for regulating an amount of peripheral light in said projection optical system.

20. A projection system, according to claim 17, wherein said optical modulation element has an ON inclination state and an OFF inclination state, wherein light is reflected toward an interior portion of said projection optical system by said optical modulation element in an ON inclination state and light is reflected outwardly away from said projection optical system by said optical modulation element in an OFF inclination state.

21. A projection system, according to claim 17, wherein an optical element in said illumination optical system that is closest to said optical modulation element is positioned at an incline relative to the optical axis of the projection system.

22. A projection system, according to claim 17, wherein the following condition is satisfied:

$$2 \leq Fa \leq 4,$$

where Fa represents a F-number on an optical modulation element side of said illumination optical system.

23. A projection system, according to claim 17, wherein the following condition is satisfied.

$$-1.5 \leq Ua \leq 7.5,$$

where Ua represents an angle (in degrees) formed by said optical axis and an upper ray at a peripheral region of said illumination system.

24. A projection system, according to claim 17, wherein the following condition is satisfied $$100 \leq Xb \leq 250,$$

where Xb (mm) represents a distance along said optical axis of the projection system from an entrance pupil of said projection optical system, on an optical modulation element side of said projection optical system, to said optical modulation element.

25. A projection system, according to claim 17, wherein the following condition is satisfied:

$$2 \leq Fb \leq 4,$$

where Fb represents a F-number on an optical modulation element side of said projection optical system

26. A projection system, according to claim 17, wherein the following condition is satisfied:

$$-7.5 \leq Ub \leq 1.5,$$

where Ub represents an angle (in degrees) formed by said optical axis and an upper ray of light at a peripheral region of said projection optical system.

27. A projection system, according to claim 17, wherein the following condition is satisfied:

$$1.5f \leq L \leq 4.6f,$$

where f (mm) represents a focal length of said projection optical system, and

L (mm) represents a lens-back length of said projection optical system.

* * * * *